(12) United States Patent
Boduch et al.

(10) Patent No.: US 9,900,671 B2
(45) Date of Patent: *Feb. 20, 2018

(54) METHOD AND APPARATUS FOR OPTICAL NODE CONSTRUCTION USING FIELD PROGRAMMABLE PHOTONICS

(71) Applicants:Mark E. Boduch, Geneva, IL (US); Kimon Papakos, Evanston, IL (US)

(72) Inventors: Mark E. Boduch, Geneva, IL (US); Kimon Papakos, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/363,241

(22) Filed: Nov. 29, 2016

(65) Prior Publication Data

US 2017/0078042 A1    Mar. 16, 2017

Related U.S. Application Data

(62) Division of application No. 14/485,970, filed on Sep. 15, 2014, now Pat. No. 9,788,088.

(60) Provisional application No. 61/880,860, filed on Sep. 21, 2013.

(51) Int. Cl.
*H04J 14/02* (2006.01)
*H04B 10/294* (2013.01)
*H04Q 11/00* (2006.01)

(52) U.S. Cl.
CPC ..... *H04Q 11/0005* (2013.01); *H04B 10/2941* (2013.01); *H04J 14/0204* (2013.01); *H04J 14/0212* (2013.01); *H04J 14/0217* (2013.01); *H04J 14/0221* (2013.01); *H04Q 2011/0013* (2013.01); *H04Q 2011/0016* (2013.01); *H04Q 2011/0035* (2013.01); *H04Q 2011/0052* (2013.01)

(58) Field of Classification Search
None
See application file for complete search history.

(56) References Cited

U.S. PATENT DOCUMENTS

| | | | |
|---|---|---|---|
| 9,008,514 B2 | 4/2015 | Boduch et al. | |
| 9,276,695 B2 | 3/2016 | Boduch et al. | |
| 9,374,186 B1 | 6/2016 | Boduch et al. | |
| 2004/0161234 A1* | 8/2004 | Ozawa | H04B 10/077 398/33 |
| 2015/0055952 A1* | 2/2015 | Younce | H04J 14/0212 398/48 |
| 2016/0269140 A1 | 9/2016 | Boduch et al. | |

* cited by examiner

*Primary Examiner* — David Payne
*Assistant Examiner* — Casey Kretzer

(57) ABSTRACT

Example embodiments of the present invention relate to an optical signal processor comprising of at least one wavelength processing device, a plurality of optical amplifying devices, and a least one field programmable photonic device.

13 Claims, 13 Drawing Sheets

WAVELENGTH EQUALIZER

US 9,900,671 B2

METHOD AND APPARATUS FOR OPTICAL NODE CONSTRUCTION USING FIELD PROGRAMMABLE PHOTONICS

RELATED APPLICATION

This application is a divisional of U.S. application Ser. No. 14/485,970, filed on Sep. 15, 2014, which claims the benefit of: U.S. Provisional Application No. 61/880,860, filed on Sep. 21, 2013. The entire teachings of the above applications are incorporated herein by reference. The specification of the present invention is substantially the same as that of the parent application. The "Related Application" paragraph has been revised to include a specific reference to the parent application. The specification of the present invention contains no new subject matter.

BACKGROUND

As the bandwidth needs of end customers increases, larger amounts of optical bandwidth will need to be manipulated closer to the end customers. A new breed of optical processing equipment will be needed to provide high levels of optical bandwidth manipulation at the lower cost points demanded by the networks closest to the end customers. This new breed of optical processing equipment will require new levels of optical signal processing integration.

SUMMARY

A method and corresponding apparatus in an example embodiment of the present invention relates to providing a means of quickly creating specific-function optical nodes using field programmable photonics (FPP). The example embodiments include a light processing apparatus utilizing field programmable photonics and field programmable photonic devices, whose level of equipment redundancy matches the economics associated with the location of the apparatus within provider networks. Additionally, the example embodiments include a light processing apparatus utilizing application specific photonics and application specific photonic devices.

An optical signal processor is presented. The optical signal processor comprises: at least one wavelength equalizing array, a plurality of optical amplifying devices, and at least one field programmable photonic device. Within the optical signal processor, the plurality of optical amplifiers may comprise an optical amplifier array. Additionally, within the optical signal processor, the field programmable photonic device may comprise a plurality of optical coupler devices that are interconnected with optical switches. The optical coupler devices and the optical switches may be integrated together on a substrate. Additionally, the plurality of optical coupler devices may be interconnected to input and output ports with optical switches.

An optical node is presented. The optical node comprises: at least one wavelength equalizing array, a plurality of optical amplifying devices, and at least one field programmable photonic device. The optical node may comprise at least two optical degrees. The at least one wavelength equalizing array may be used to select wavelengths for the at least two optical degrees, and to perform directionless steering for the add/drop ports. Alternatively, the optical node may comprise at least three optical degrees. Alternatively, the optical node may comprise at least four optical degrees. The optical node may further comprise a plurality of directionless add/drop ports.

A ROADM circuit pack is presented. The ROADM circuit pack comprises: at least one wavelength equalizing array, a plurality of optical amplifying devices, and at least one field programmable photonic device.

An optical signal processor is presented. The optical signal processor comprises: at least one wavelength equalizing array, a plurality of optical amplifying devices, and at least one application specific photonic device. The application specific photonic device comprises a plurality of optical coupler devices. The plurality of optical coupler devices are integrated together on a substrate. The optical signal processor may comprise at least two optical degrees. Alternatively, the optical signal processor may comprise at least three optical degrees. Alternatively, the optical signal processor may comprise at least four optical degrees. The optical signal processor may further comprise a plurality of directionless add/drop ports.

A method of performing optical signal processing is presented. The method comprises: filtering individual wavelengths utilizing at least one wavelength equalizing array, amplifying groups of wavelengths using a plurality of optical amplifying devices, and performing multiple networking applications using a field programmable photonic device.

A method of performing functions of a multi-degree optical node is presented. The method comprises filtering individual wavelengths utilizing at least one wavelength equalizing array, amplifying groups of wavelengths using a plurality of optical amplifying devices, and programming a field programmable photonic device to create optical nodes of differing capabilities.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
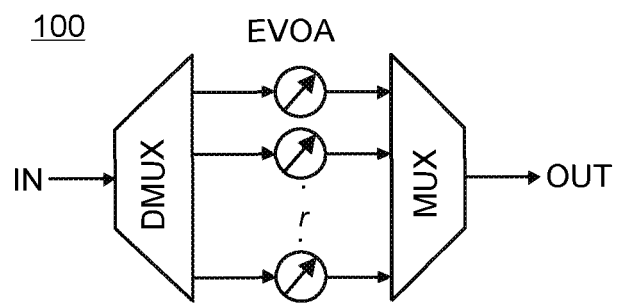
FIG. 1 is an illustration of a wavelength equalizer.

FIG. 1 is an illustration of a wavelength equalizer 100 consisting of; a wavelength de-multiplexer (DMUX) that is used to separate a composite Wavelength Division Multiplexed (WDM) signal into r number of individual wavelengths, a plurality of Electrical Variable Optical Attenuators (EVOAs) used to partially or fully attenuate the individual wavelengths, and a wavelength multiplexer (MUX) that is used to combine r number of individual wavelengths into a composite Wavelength Division Multiplexed (WDM) signal. In addition to its optical elements (MUX, DMUX, and EVOAs), the wavelength equalizer 100 contains electronic circuitry (not shown) used to control the EVOAs, and a user interface (not shown) that is used to program the electronic circuitry of the EVOAs. The optical processing of each individual wavelength may be independently controlled. The optical power level of each individual wavelength may be attenuated by a programmable amount by sending a command through the user interface. The command is used by the electronic circuitry to set the attenuation value of the appropriate EVOA. Additionally, each individual EVOA can be program to substantially block the light associated with an incoming optical wavelength. Controlled attenuation ranges for typical EVOAs are 0 to 15 dB, or 0 to 25 dB. Blocking attenuation is typically 35 dB or 40 dB.

Figure 2:
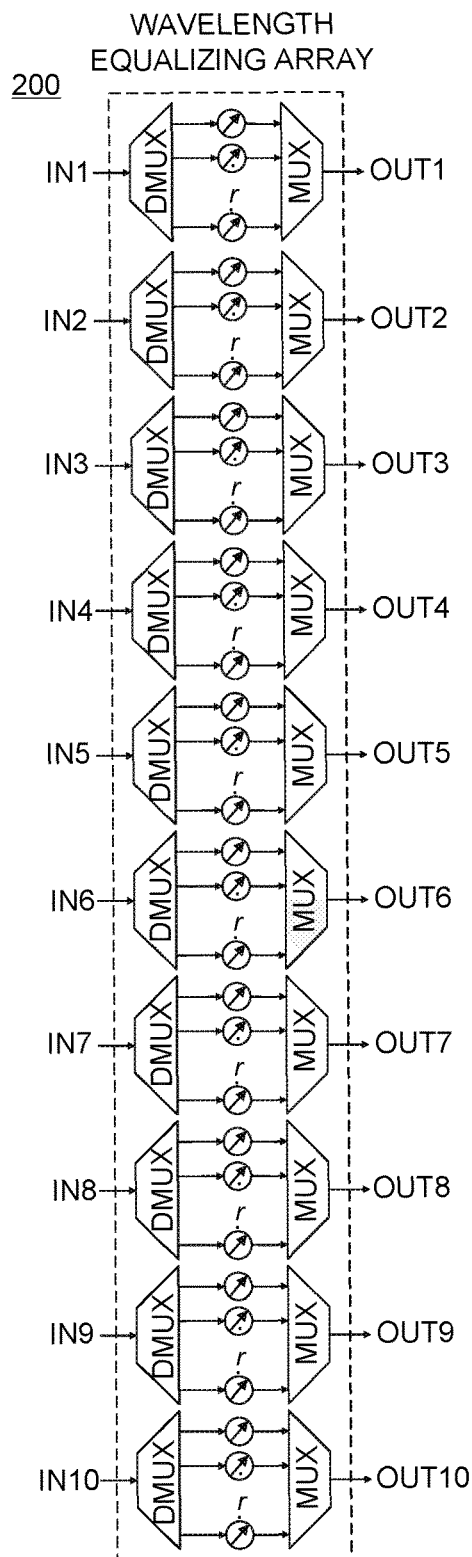
FIG. 2 is an illustration of a wavelength equalizing array containing ten wavelength equalizers.

FIG. 2 is an illustration of a wavelength equalizing array 200 contained within a single device. The wavelength equalizing array contains ten wavelength equalizers that may be of the type 100 illustrated in FIG. 1.

The wavelength equalizing array 200 contains ten optical inputs (IN1-IN10) that are attached to the inputs of the wavelength equalizers, and ten optical outputs (OUT1-OUT10) that are attached to the outputs of the wavelength equalizers. The electronic circuitry (not shown) used to control the EVOAs may reside within the wavelength equalizing array device, or may reside external to the wavelength equalizing array device.

Figure 3:
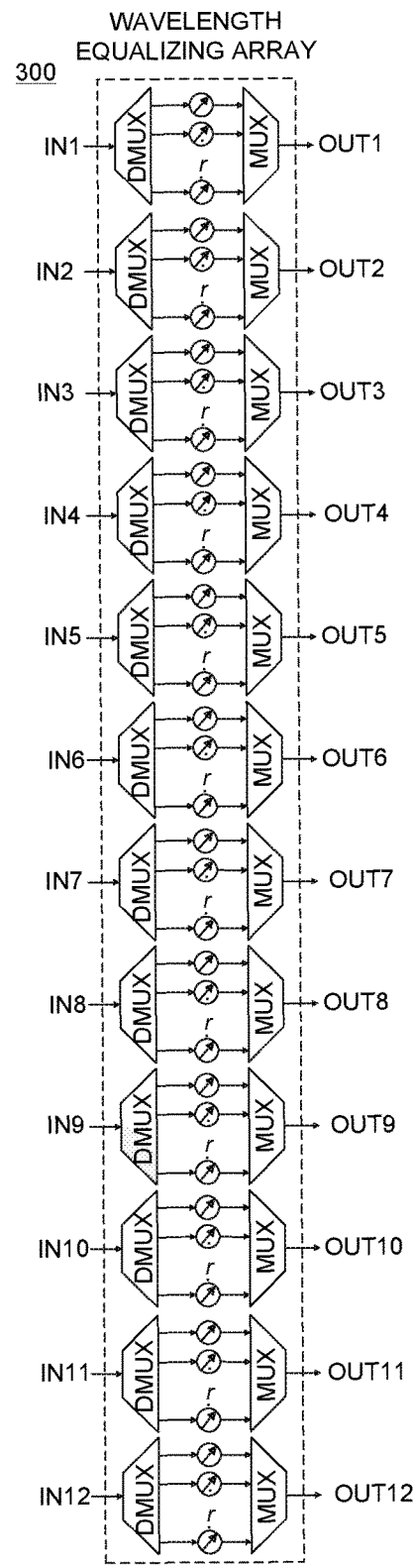
FIG. 3 is an illustration of a wavelength equalizing array containing twelve wavelength equalizers.

FIG. 3 is an illustration of a wavelength equalizing array 300 containing twelve wavelength equalizers that may be of the type 100 illustrated in FIG. 1. The array may be contained within a single device.

Although wavelength equalizing arrays 200 and 300 illustrate arrays with ten and twelve wavelength equalizers respectively, in general there is no limit to the number of wavelength equalizers that can be placed within a single device. Therefore, arrays with sixteen, twenty-four, or thirty-two wavelength equalizers may be possible.

Multiple different technologies may be used to implement the wavelength equalizing arrays 200 and 300, including Planer Lightwave Circuit (PLC) technology and various free-space optical technologies such as Liquid Crystal on Silicon (LCoS). The Wavelength Processing Array (WPA-12) from Santec Corporation is an example of a commercially available wavelength equalizing array containing twelve wavelength equalizers. The wavelength equalizing arrays 200 and 300 may be implemented by placing PLC based EVOAs and multiplexers (Arrayed Waveguide Gratings (AWG)) on a single substrate.

Figure 4:
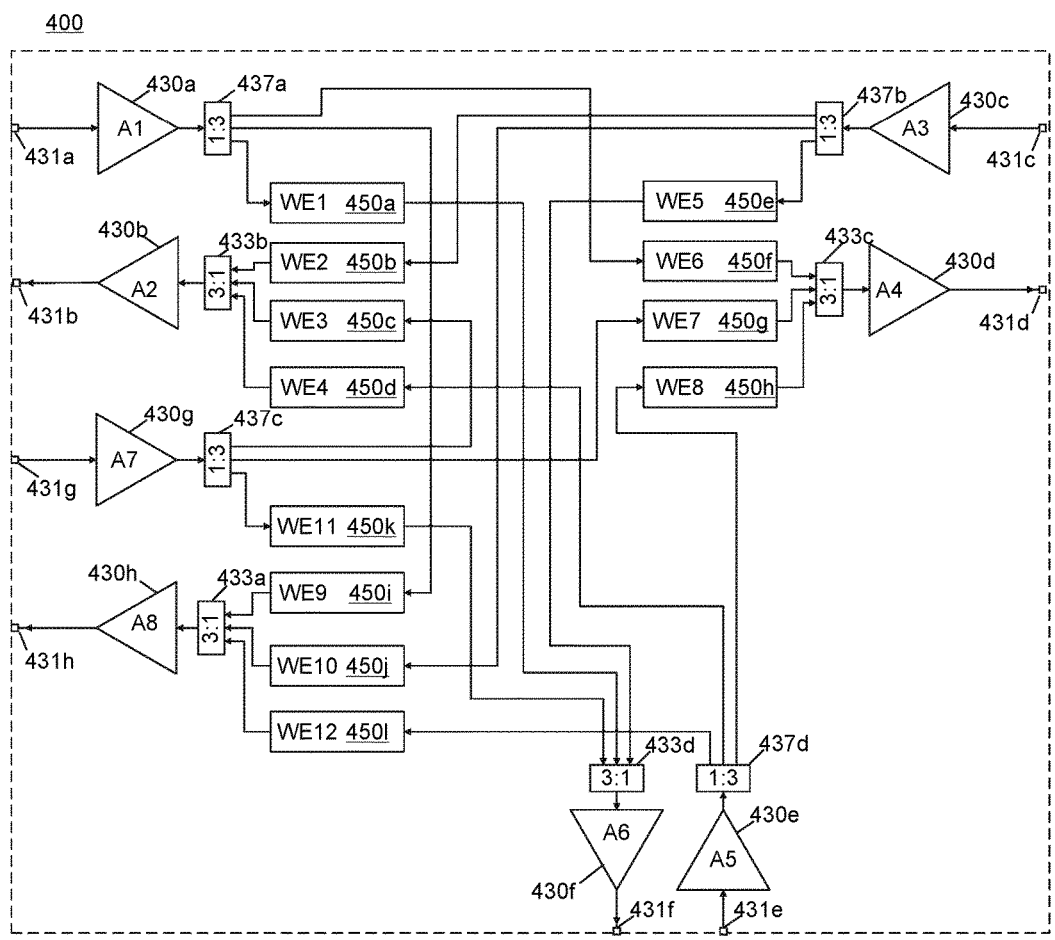
FIG. 4 is an illustration of an optical signal processor that can be used to create a three degree optical node.

FIG. 4 shows an optical signal processor (OSP) 400 consisting of eight optical amplifiers 430$a$-$h$, and twelve wavelength equalizers 450$a$-$l$ that may be contained within a single wavelength equalizing array 300. The wavelength equalizing array is a wavelength processing device. A wavelength processing device is defined as any optical device that optically operates on individual wavelengths of a WDM signal. For example, wavelength equalizing array is able to attenuate and block individual wavelengths within a plurality of WDM signals. The optical signal processor 400 receives four WDM signals; one from each of the four interfaces 431$a$, 431$c$, 431$e$, and 431$g$. These four signals are then amplified by optical amplifiers 430$a$, 430$c$, 430$e$, and 430$g$. Following amplification, each of the four signals is broadcasted to three different wavelength equalizers 450$a$-$l$ using 1:3 couplers 437$a$-$d$. The wavelength equalizers 450$a$-$l$ can be configured to attenuate each individual wavelength by some programmable amount. Alternatively each of the wavelength equalizers 450$a$-$l$ can be configured to substantially block the individual wavelengths that pass through it. After passing through the wavelength equalizers, WDM signals are combined into groups of three using optical couplers 433$a$-$d$. The combined WDM signals are then amplified using optical amplifiers 430$b$, 430$d$, 430$f$, and 430$h$, before being outputted to optical interfaces 431$b$, 431$d$, 431$f$, and 431$h$.

The optical signal processor (OSP) 400 can be used to construct a three or four degree WDM optical node. If the optical circuitry associated with the optical signal processor 400 is wholly placed on a single circuit pack, the circuit pack would contain a fully integrated three or four degree ROADM. The ROADM circuit pack could serve as a four degree ROADM with no add/drop ports by using each input/output port pair 431$a$-$b$, 431$c$-$d$, 431$e$-$f$, and 431$g$-$h$ as an optical degree. Alternatively, if combined with some form of wavelength multiplexing/demultiplexing circuitry, the ROADM circuit pack could serve as a three degree ROADM. For this case, input/output interface 431$e$-$f$ may serve as the port used to interface to the wavelength multiplexing/demultiplexing circuitry. In order to complete the three degree node, optical transponders would be attached to add and drop ports of the wavelength multiplexing/demultiplexing circuitry.

Alternatively, any of the other three input/output interfaces 431$a$-$b$, 431$c$-$d$, 431$g$-$h$ may serve as the interface to the wavelength multiplexing/demultiplexing circuitry, as each input/output interface is identical with respect to the function of and interconnection to all other input/output interfaces.

When operating as a three or four degree ROADM, the wavelength equalizers are programmed to pass and/or block wavelengths in order to pass or block wavelengths between input/output port pairs. For example, a wavelength arriving at input port 431$a$ could be passed to output port 431$d$ by programming wavelength equalizer 450$f$ to pass the wavelength. In a similar manner, a wavelength arriving at input port 431$g$ could be blocked from output port 431$b$ by programming wavelength equalizer 450$c$ to block the wavelength.

If a circuit pack containing wavelength multiplexing/demultiplexing circuitry is attached to input/output interface 431$e$-$f$, then that circuit pack is able to add and drop wavelengths to and from any of the three other input/output interfaces (431$a$-$b$, 431$c$-$d$, and 431$g$-$h$). Because of this functionality, it can be said that input/output interface 431$e$-$f$ provides directionless add/drop ports for the other three interfaces (i.e., the add/drop ports are not dedicated to a sole degree direction).

Figure 5A:
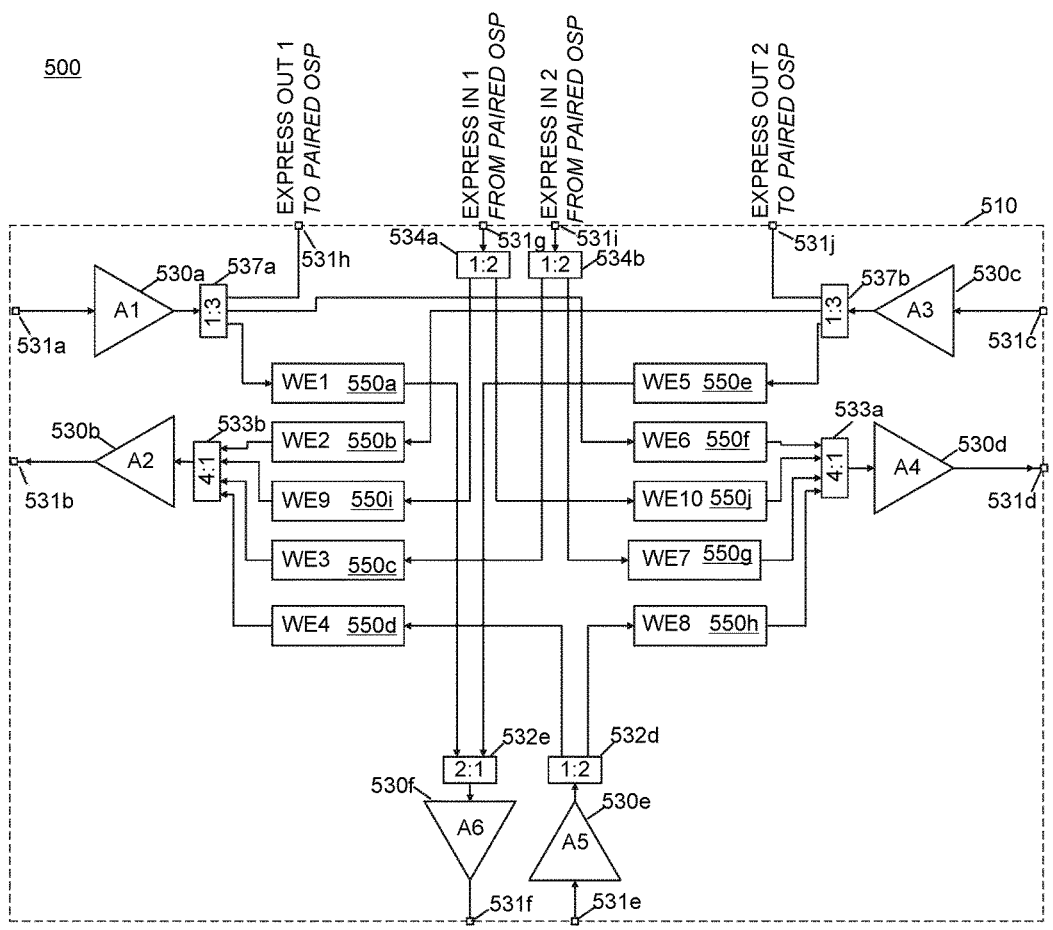
FIG. 5A is an illustration of an optical signal processor that can be used to create a four degree optical node.
Figure 5B:
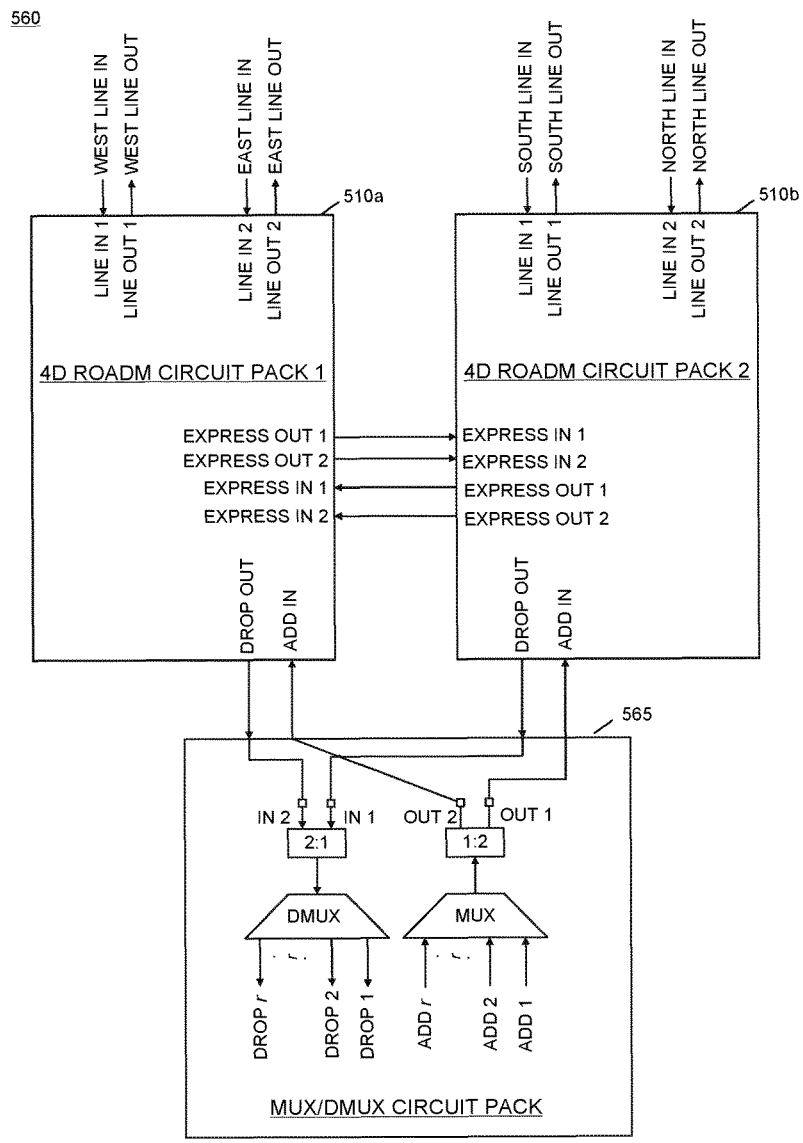
FIG. 5B is an illustration of how a single multiplexing/de-multiplexing circuit pack can be attached to two four degree ROADM circuit packs.

FIG. 5 shows an optical signal processor (OSP) 510 consisting of six optical amplifiers 530a-f, and ten wavelength equalizers 550a-h that may be contained within a single wavelength equalizing array 200. The wavelength equalizing array is a wavelength processing device. A wavelength processing device is defined as any optical device that optically operates on individual wavelengths of a WDM signal. The optical signal processor 510 receives three WDM signals; one from each of the three interfaces 531a, 531c, and 531e. These three signals are then amplified by optical amplifiers 530a, 530c, and 530e. Following amplification, each of the three signals is broadcasted to two different wavelength equalizers 550a/550f, 550b/550e, and 550d/550h using couplers 537a, 537b, and 532d. In addition, the WDM signals on interfaces 531a and 531c are broadcasted to the interfaces 531h and 531j respectively. Also, the WDM signals on input interfaces 531g and 531i are broadcasted to wavelength equalizers 550i/550j and 550c/550g respectively using couplers 534a and 534b. The wavelength equalizers 550a-h can be configured to attenuate each individual wavelength by some programmable amount. Alternatively each of the wavelength equalizers 550a-h can be configured to substantially block the individual wavelengths that pass through it. After passing through the wavelength equalizers, WDM signals are combined into two groups of four using optical couplers 533a-b, and one group of two using optical coupler 532e. The combined WDM signals are then amplified using optical amplifiers 530b, 530d, and 530f, before being outputted to optical interfaces 531b, 531d, and 531f.

Figure 5C:
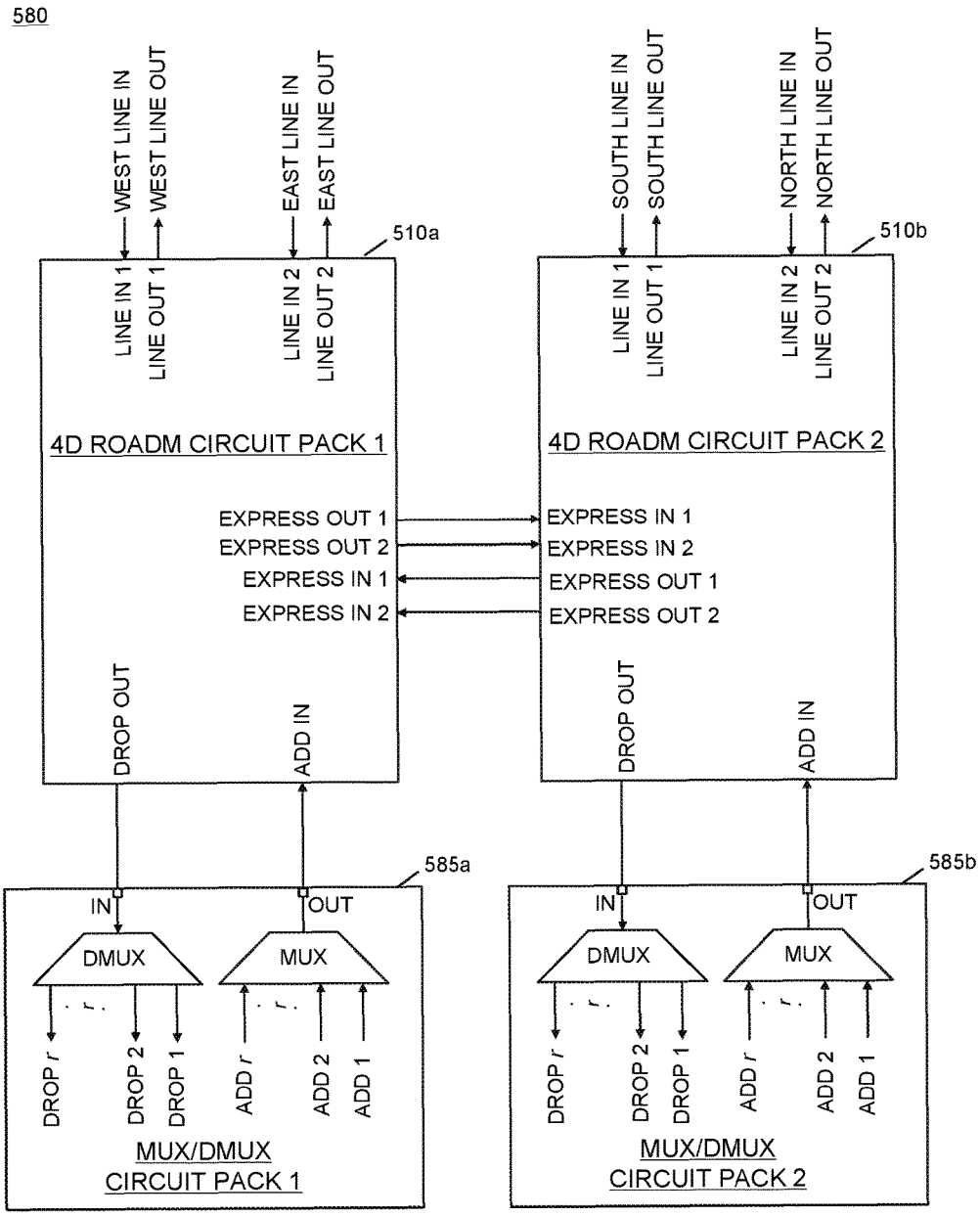
FIG. 5C is an illustration of how a two multiplexing/de-multiplexing circuit packs can be attached to two four degree ROADM circuit packs.

The optical signal processor (OSP) 510 can be used to construct a two or four degree WDM optical node. If the optical circuitry associated with the optical signal processor 510 is wholly placed on a single circuit pack, the circuit pack would contain a fully integrated two degree ROADM that can be expanded to support a four degree node if two such ROADMs are paired. If combined with some form of wavelength multiplexing/demultiplexing circuitry, the ROADM circuit pack could serve as a two degree ROADM. For this case, input/output interface 531e-f may serve as the port used to interface to the wavelength multiplexing/demultiplexing circuitry. In order to complete the two degree node, optical transponders would be attached to add and drop ports of the wavelength multiplexing/demultiplexing circuitry. If two of the ROADM circuit packs are paired, by optically connecting Express Out 1 and Express Out 2 on the first ROADM circuit pack to Express In 1 and Express In 2 on the second ROADM circuit pack, and vice versa, a four degree node is formed. For the four degree case, either a single set of multiplexing/demultiplexing circuitry 565 could be shared between the two ROADM circuit packs 560 (FIG. 5B), or each ROADM circuit pack could have its own dedicated multiplexing/demultiplexing circuitry 580 (FIG. 5C). In four degree node 560 and node 580, ports Line In 1 and Line Out 1 may be interfaces 531a and 531b respectively, and ports Line In 2 and Line Out 2 may be interfaces 531c and 531d respectively, while the ports Add In and Drop Out may be the interfaces 531e and 531f respectively. In 560, all the add/drop interfaces are able to send and receive from any of the four line interfaces, and therefore are considered directionless add/drop ports. In 580, the add/drop ports can only send and receive wavelengths to and from the two line interfaces that are associated with the ROADM circuit pack that they are attached to, and therefore, the add/drop ports are said to be partially directionless add/drop ports.

If in 580 the ROADM circuit pack 510a is used in a two degree node application without a paired ROADM 510b, then the add/drop ports of the multiplexing/demultiplexing circuit pack 585a are (fully) directionless with respect to the two degree node. The wavelength equalizing array on the ROADM circuit pack 510a is used to both select wavelengths for each degree, and to perform directionless steering for the add/drop ports of each degree.

When operating as a two or four degree ROADM, the wavelength equalizers are programmed to pass and/or block wavelengths in order to pass or block wavelengths between input/output port pairs. For example, a wavelength arriving at input port 531a could be passed to output port 431d by programming wavelength equalizer 550f to pass the wavelength. In a similar manner, a wavelength arriving at input port 531c could be blocked from output port 531b by programming wavelength equalizer 550b to block the wavelength.

In order to either limit the number of supported circuit packs or in order to simplify the manufacturing process, field configurable or field programmable photonics can be introduced.

Figure 6:
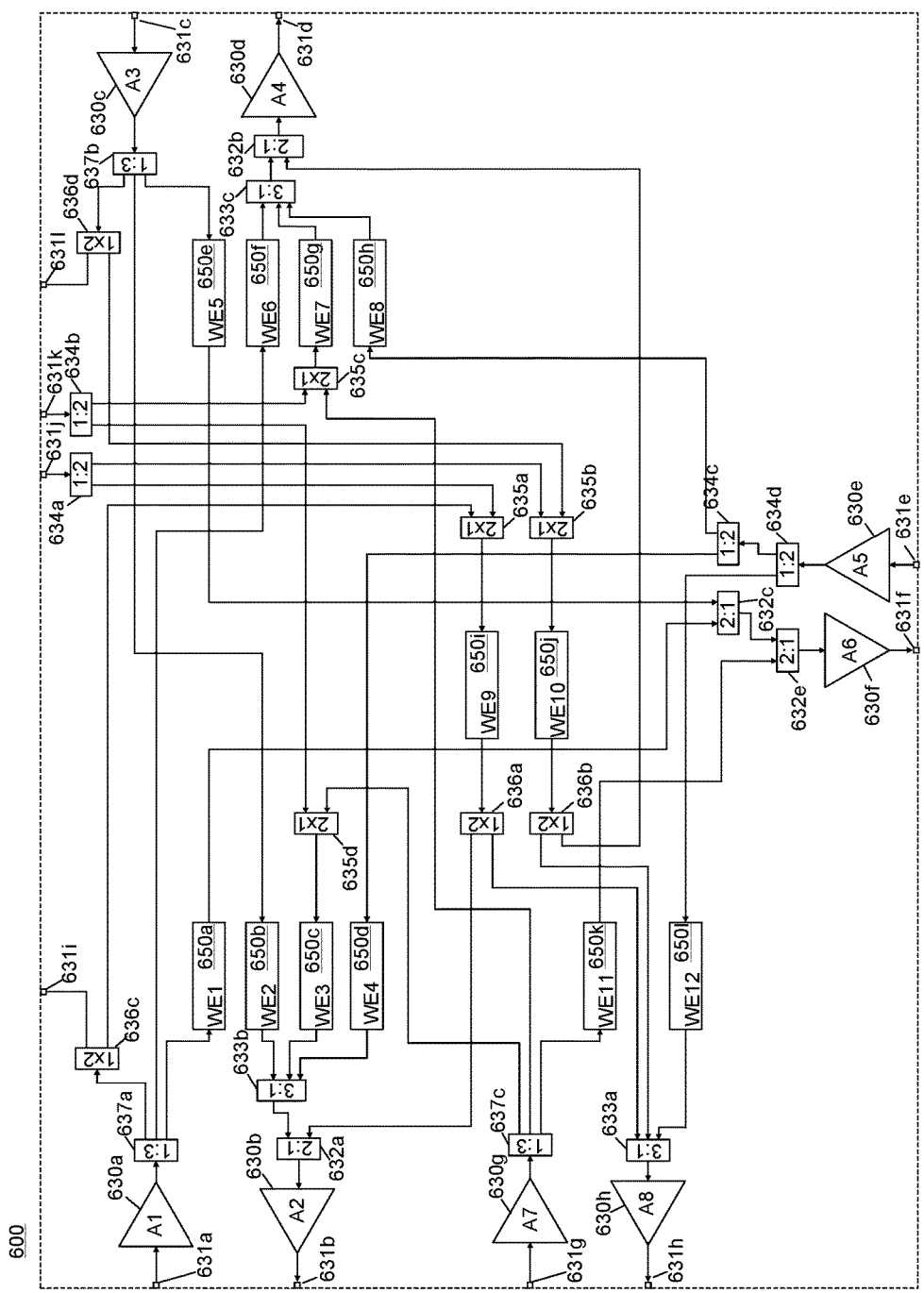
FIG. 6 is an illustration of an optical signal processor that can be used to create a three or four degree optical node.

FIG. 6 shows an optical signal processor 600 that can perform the function of either optical signal processor 400 or optical signal processor 510. The dual functionality is enabled by the use of a set of 1 by 2 (636a-d) and 2 by 1 (635a-d) optical switches. In addition, some of the optical couplers may ideally be replaced with variable coupling ratio optical couplers (i.e., variable optical couplers). A common wavelength equalizing array containing twelve wavelength equalizers 300 could be used in both application, or if the optical signal processor is customized during manufacturing, two different wavelength equalizing arrays could be used—with both arrays having a common optical interface (perhaps an MTP connector with 24 fibers). An optical amplifier array containing eight amplifiers could be used to support both optical signal processor 400 and 510. Alternatively, if the optical signal processor is customized during manufacturing, two different wavelength optical amplifier arrays could be used, or a plurality of discrete pluggable amplifier sets could be used (one set for each pair of input/output amplifiers). Yet another alternative would be to place the optical signal processor 600 on a circuit pack with a front panel that contained slots to populate pairs of input/output amplifiers. This would easily allow an end user to populate the amplifier pair 630g-h only when operating the optical signal processor as a three degree ROADM. This arrangement would also allow an end user to populate input amplifiers 630a, 630c, and 630g with different gain ranges in order to more efficiently accommodate optical spans of varying length.

In the optical signal processor 600, the three degree function 400 can be programmed by programming optical switch 636c to direct its light to optical switch 635a, programming optical switch 636d to direct its light to optical switch 635b, programming optical switches 636a and 636b to direct their light to optical coupler 633a, programming optical switches 635c and 635d to receive their light from optical coupler 637c, programming optical switch 635a to receive its light from optical coupler 636c, and programming optical switch 635b to receive its light from optical coupler 636d. In addition, ideally, optical couplers 632a and 632b should be variable optical couplers wherein in the 400 application all the light exiting them should be directed from optical couplers 633b and 633c respectively. In addition, ideally, optical coupler 632a and 632b should be variable optical couplers wherein in the 510 application one quarter (¼) of the light exiting couplers 632a and 632b respectively should come from optical switches 636a and 636b respectively. Using other variable optical couplers in place of fixed coupling ratio optical couplers may also further optimize the application for the lowest insertion losses through various optical paths.

In optical signal processor 600, the four degree function 510 can be programmed by programming optical switch 636c to direct its light to optical interface 631i, programming optical switch 636d to direct its light to optical interface 631l, programming optical switches 636a and 636b to direct their light to optical couplers 632a and 632b respectively, programming optical switches 635c and 635d to receive their light from optical coupler 634b, and programming optical switches 635a and 635b to receive their light from optical coupler 634a. Using other variable optical couplers in place of fixed coupling ratio optical couplers may also further optimize the application for the lowest insertion losses through various optical paths.

From the diagram in FIG. 6, it can be seen that wavelength equalizers 650k and 650l are used only for the 400 application, and in addition optical amplifiers 630g and 630h—and their associated external interfaces 631g and 631h—are used only for the 400 application. Lastly, external interfaces 631i, 631j, 631k, and 631l are only used for the 510 application.

Figure 7:
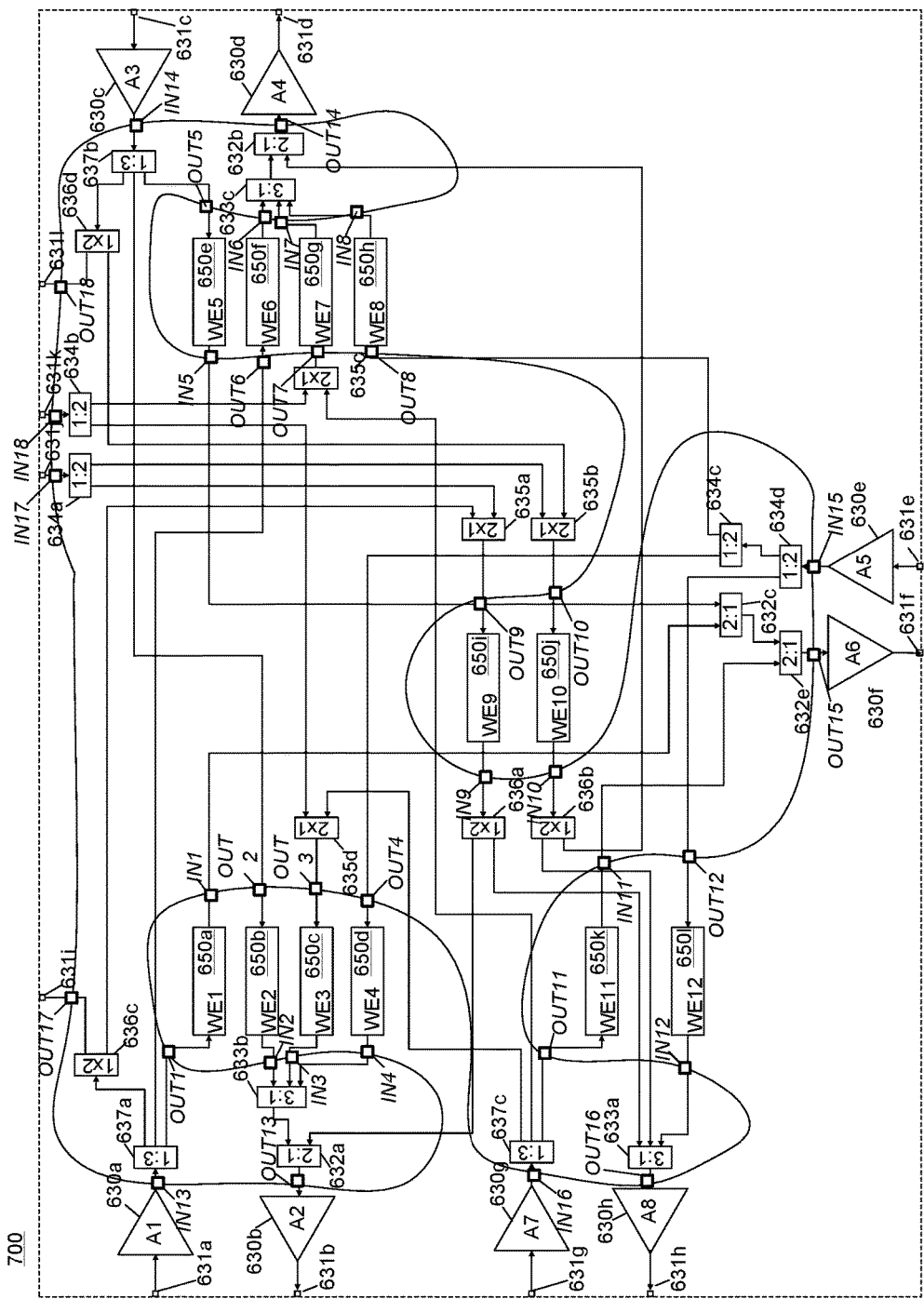
FIG. 7 is a detailed illustration of an optical signal processor that can be used to create a three or four degree optical node, with field programmable photonics.

FIG. 7 illustrates the optical elements of 600 that would be placed in a field programmable photonic device. As can be seen in 700, the elements that would be placed in the field programmable photonic device have been circled, and only the optical amplifiers and wavelength equalizers are placed outside of the field programmable photonic device. Additionally PLC based wavelength equalizers may be placed within the field programmable photonic device if this makes economic sense in the future. The inputs and outputs of the field programmable photonic device have been labeled as INi and OUTi in FIG. 7. As can be seen, there are 18 optical inputs to the FPP device, and 18 optical outputs.

Figure 8:
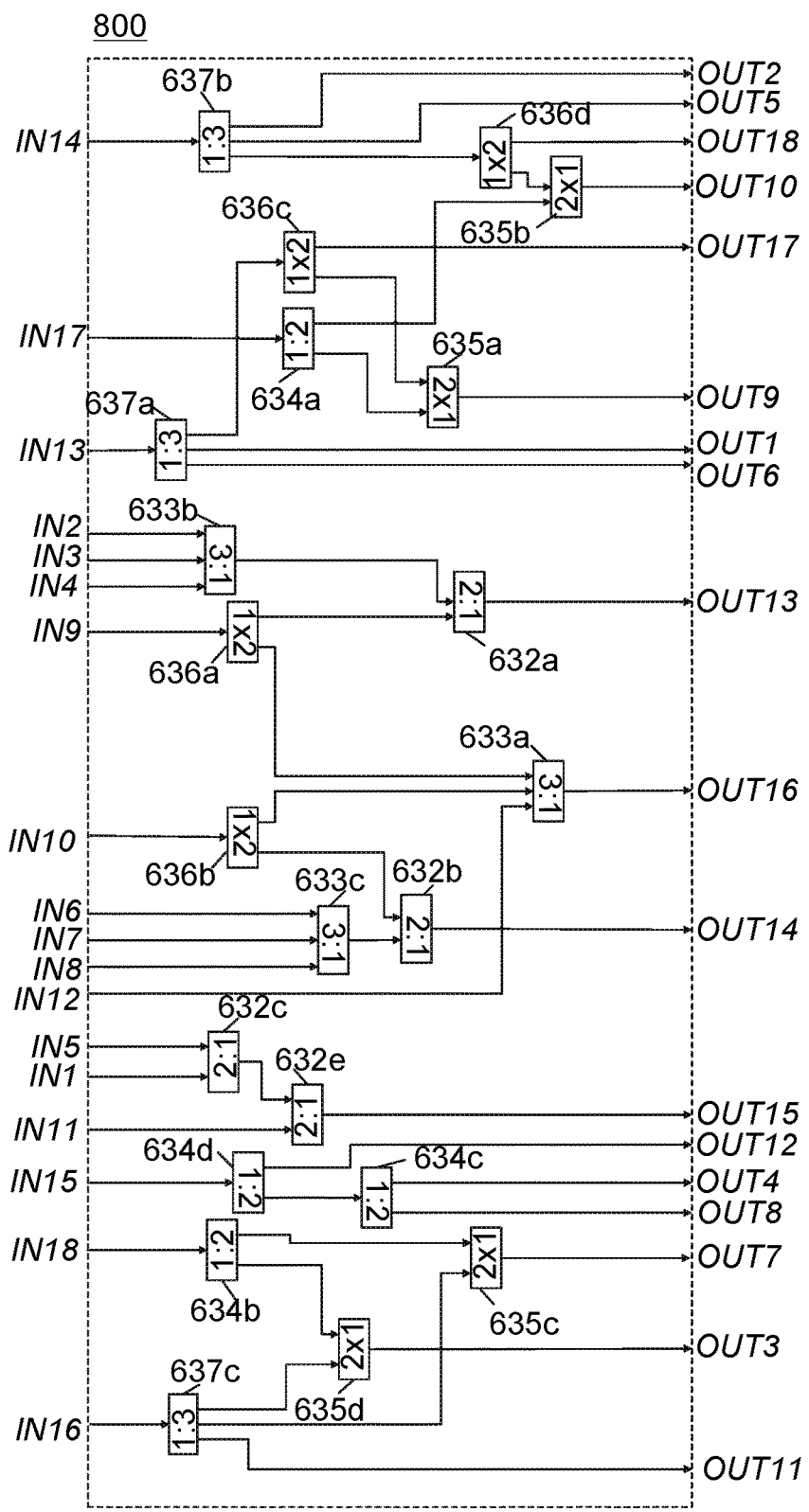
FIG. 8 is a detailed look inside of a field programmable photonic device.

FIG. 8 shows the field programmable photonic elements of 700 grouped together into one field programmable photonic (FPP) device 800, wherein the entry and exit labels INi and OUTi in 800 correspond to the labels INi and OUTi of the entry and exit points of the FPP in 700. As can be seen, the field programmable photonic device 800 is comprised of a plurality of optical coupler devices whose interconnection to the input and output ports of the device is done using optical switches. Additionally (not shown), optical switches could be used to interconnect one or more optical couplers together within the field programmable photonic device, in order to add additional functionality. The optical couplers and optical switches in 800 may be integrated together on a common substrate in order to enable the mass manufacture of the field programmable photonic device.

Figure 9:
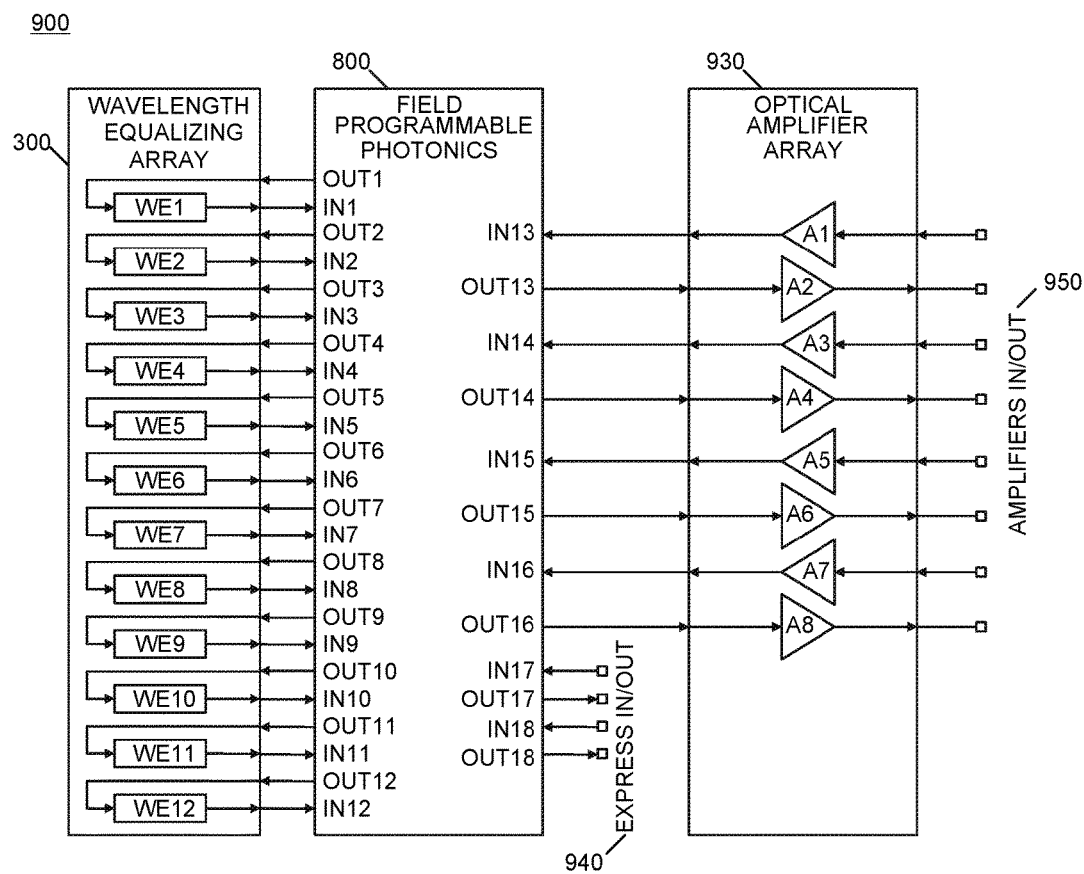
FIG. 9 is a high level diagram showing the three optical building blocks of an optical signal processor that can be used to create a three or four degree optical node.

FIG. 9 is a high level diagram showing the three optical building blocks of an optical signal processor that can be used to create a three or four degree optical node. Interconnection between the three major components may most easily be done by using parallel fiber optic cables with MTP optical connectors. The wavelength equalizing array 300 may be substantially the same as the wavelength equalizing array 300 discussed in reference to FIG. 3. The field programmable photonic device 800 may be substantially the same as the field programmable photonic device 800 discussed in reference to FIG. 8.

Based upon the previous embodiments, it is clear that the wavelength equalizing array becomes a common building block that can be paired with field programmable optics to build optical signal processors with any number of functions—limited only by the complexity of the field programmable photonics. For instance, in addition to the two, three, and four degree integrated ROADM products that can be built with the described field programmable photonics, additional optical circuitry could be added to the FPP that would provide for some number of colorless optical add/drop ports for a non-expandable two degree ROADM.

Figure 10A:
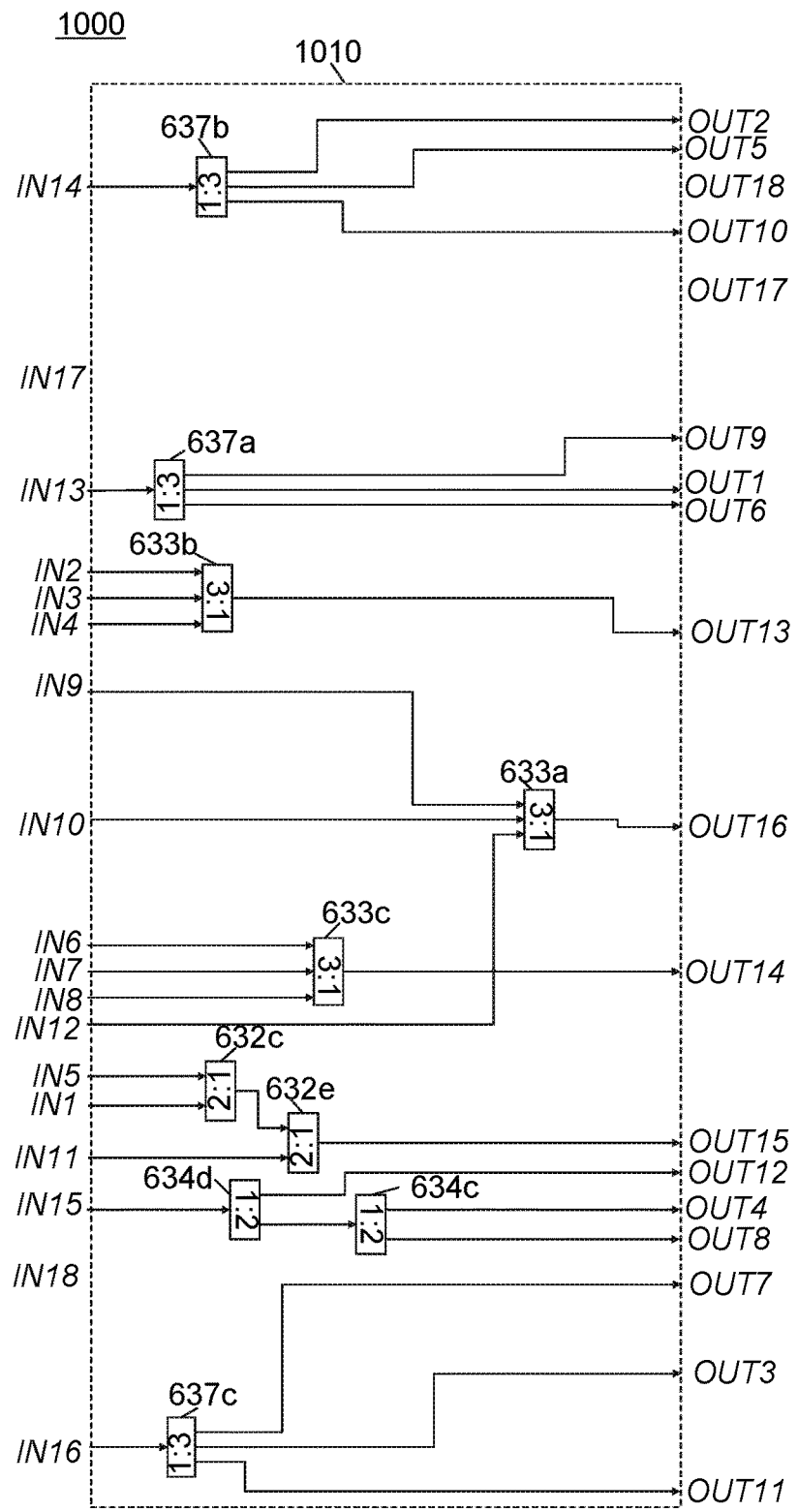
FIG. 10A is a detailed look inside of an application specific photonic device that can be used to construct a three degree optical node.
Figure 10B:
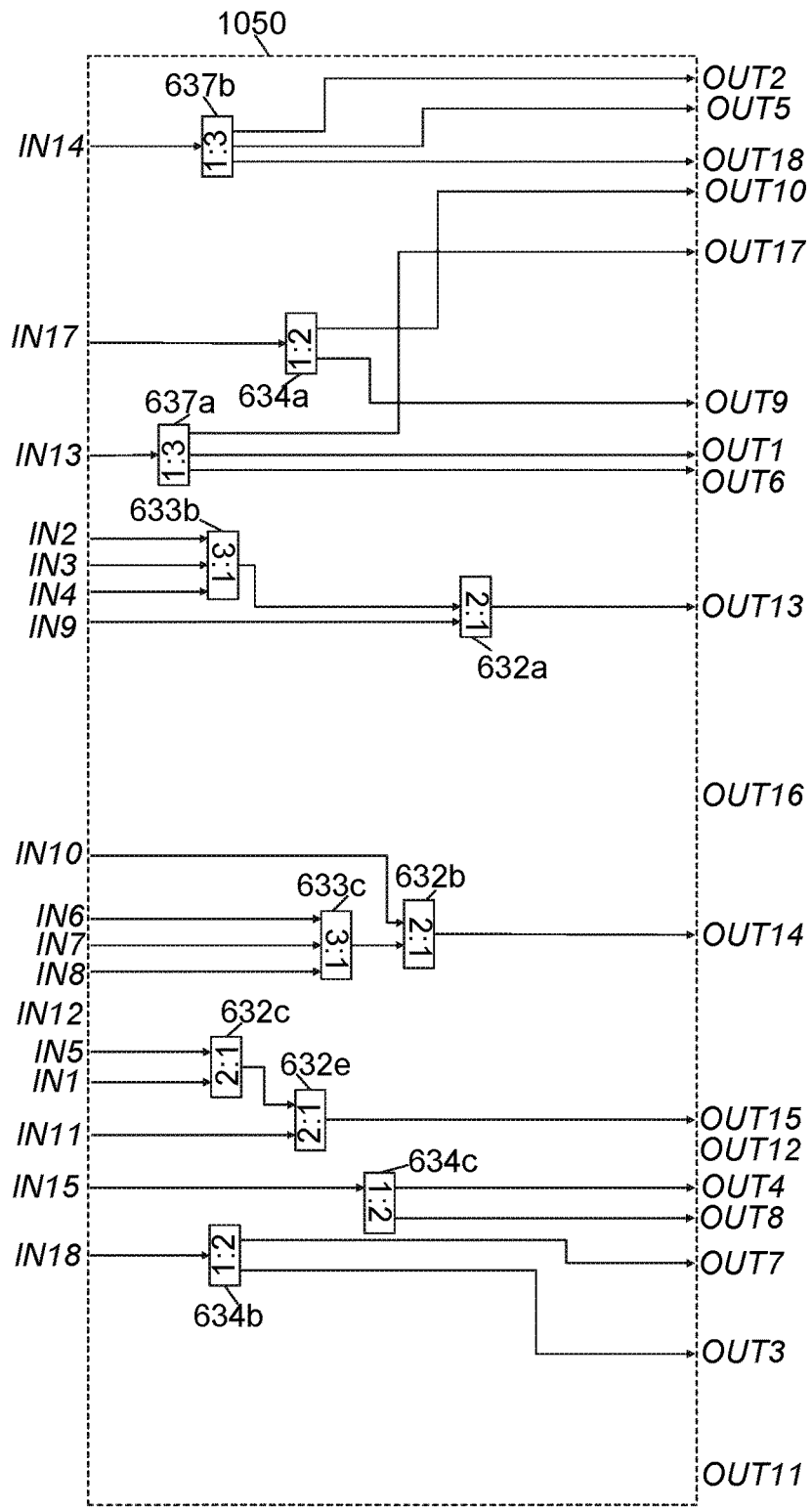
FIG. 10B is a detailed look inside of an application specific photonic device that can be used to construct a four degree optical node.

As an alternative to using a single field programmable photonic device 800, multiple Application Specific Photonic (ASP) devices may be used to create optical signal processors with differing capabilities. The Application Specific Photonic devices may have substantially the same physical form factor, electrical connectors, and optical connectors, in order to allow one to easily swap between different single-application photonic devices when configuring the optical signal processor for various applications. For instance, FIG. 10A and FIG. 10B show two Application Specific Photonic devices 1010, 1050 which could be used in place of the field programmable photonic device 800 on optical signal processor 900 in FIG. 9.

Application Specific Photonic device 1010 is used to implement the optical signal processor 400, while Application Specific Photonic device 1050 is used to implement the optical signal processor 510.

As can be seen, the application specific photonic devices 1010 and 1050 are comprised of a plurality of optical coupler devices. Additionally (not shown), other fixed and programmable optical devices could be contained within the application specific photonic devices in order to provide additional functionality. The optical couplers (and optionally other fixed and programmable optical devices) in 1010 and 1050 may be integrated together on a common substrate in order to enable the mass manufacture of the application specific photonic device.

A method of constructing an optical signal processor may consist of utilizing at least one wavelength processing device to operate on individual wavelengths, a plurality of optical amplifying devices to amplify groups of wavelengths, and a field programmable photonic device to allow the optical signal processor and to perform multiple networking applications.

A method of constructing multi-degree optical nodes may consist of utilizing at least one wavelength processing device to operate on individual wavelengths, a plurality of optical amplifying devices to amplify groups of wavelengths, and a field programmable photonic device that allows nodes of differing capabilities to be constructed.

What is claimed is:
1. An optical signal processor comprising:
   a wavelength equalizing array, comprising a plurality of wavelength equalizers each comprising: a single optical input, a wavelength de-multiplexer connected to the single optical input, a plurality of variable optical attenuators connected to the wavelength de-multiplexer, a wavelength multiplexer connected to the plurality of variable optical attenuators, and a single optical output connected to the wavelength multiplexer;
   a plurality of optical amplifying devices; and
   at least one field programmable photonic device residing external to the wavelength equalizing array and comprising a plurality of optical switches that are programmable to perform a first function and a second function, wherein when the plurality of optical switches are programmed to perform the first function, the plurality of wavelength equalizers pass and block individual wavelengths for three degrees of a three degree optical node, and wherein when the plurality of optical switches are programmed to perform the second function, the plurality of wavelength equalizers pass and block individual wavelengths for two degrees of a four degree optical node.

2. The optical signal processor of claim 1, wherein the plurality of optical switches comprises:
a first plurality of optical switches having at least one optical output and a first optical input and at least a second optical input and operational to direct a first inputted wavelength division multiplexed signal from the first optical input to the at least one optical output when programmed for the first function and operational to direct a second inputted wavelength division multiplexed signal from the at least a second optical input to the at least one optical output when programmed for the second function; and
a second plurality of optical switches having at least one optical input and a first optical output and at least a second optical output and operational to direct an inputted wavelength division multiplexed signal from the at least one optical input to the first optical output when programmed for the first function and operational to direct the inputted wavelength division multiplexed signal from the at least one optical input to the at least a second optical output when programmed for the second function.

3. The optical signal processor of claim 2 further comprising:
a plurality of optical inputs; and
a plurality of optical outputs,
wherein the first plurality of optical switches are used to direct wavelength division multiplexed signals from the plurality of optical inputs to a portion of the plurality of wavelength equalizers, and wherein the portion of the plurality of wavelength equalizers are used to pass and block individual wavelengths within wavelength division multiplexed signals from the first plurality of optical switches, and wherein a number of the second plurality of optical switches are used to direct wavelength division multiplexed signals from the portion of the plurality of wavelength equalizers to the plurality of optical outputs.

4. The optical signal processor of claim 1, wherein the field programmable photonic device further comprises at least one optical coupler, used to optically combine wavelength division multiplexed signals from at least two wavelength equalizers of the plurality of wavelength equalizers.

5. The optical signal processor of claim 1, wherein the field programmable photonic device further comprises at least one optical coupler, used to distribute a wavelength division multiplexed signal to a first wavelength equalizer of the plurality of wavelength equalizers and to a second wavelength equalizer of the plurality of wavelength equalizers.

6. The optical signal processor of claim 1, wherein the single optical input is used to input an input wavelength division multiplexed signal, and wherein the single optical output is used to output an output wavelength division multiplexed signal, and wherein the wavelength de-multiplexer is used to separate the input wavelength division multiplexed signal into a plurality of individual wavelengths, and wherein the plurality of variable optical attenuators are used to attenuate the plurality of individual wavelengths by some programmable amount, and wherein the wavelength multiplexer is used to combine the plurality of individual wavelengths from the plurality of variable optical attenuators into the output wavelength division multiplexed signal.

7. An optical signal processor comprising:
a first optical interface;
a second optical interface;
a third optical interface;
a fourth optical interface;
a wavelength equalizing array, comprising a plurality of wavelength equalizers each comprising: one optical input, a wavelength de-multiplexer connected to the one optical input, a plurality of variable optical attenuators connected to the wavelength de-multiplexer, a wavelength multiplexer connected to the plurality of variable optical attenuators, and one optical output connected to the wavelength multiplexer; and
a field programmable photonic device residing external to the wavelength equalizing array and comprising a plurality of optical switches that are programmable to perform a first function and a second function,
wherein when the plurality of optical switches are programmed to perform the first function, the plurality of wavelength equalizers pass and block individual wavelengths from the third optical interface to the first optical interface and from the third optical interface to the second optical interface, and the plurality of wavelength equalizers do not pass and block individual wavelengths from the fourth optical interface to the first optical interface and from the fourth optical interface to the second optical interface, and wherein when the plurality of optical switches are programmed to perform the second function, the plurality of wavelength equalizers pass and block individual wavelengths from the fourth optical interface to the first optical interface and from the fourth optical interface to the second optical interface, and the plurality of wavelength equalizers do not pass and block individual wavelengths from the third optical interface to the first optical interface and from the third optical interface to the second optical interface.

8. The optical signal processor of claim 7, wherein each wavelength equalizer of the plurality of wavelength equalizers has only one optical input and only one optical output.

9. The optical signal processor of claim 7, wherein the plurality of optical switches comprises:
a first plurality of optical switches, each having at least one switch output and a first switch input and at least a second switch input, wherein when programmed to perform the first function, light received from the first switch input is directed to the at least one switch output, and wherein when programmed to perform the second function, light received from the at least a second switch input is directed to the at least one switch output; and
a second plurality of optical switches, each having at least one switch input and a first switch output and at least a second switch output, wherein when programmed to perform the first function, light received from the at least one switch input is directed to the first switch output, and wherein when programmed to perform the second function, light received from the at least one switch input is directed to the at least a second switch output.

10. The optical signal processor of claim 7, wherein the first optical interface is a first optical degree of an optical node, and wherein the second optical interface is a second optical degree of the optical node, and wherein the third optical interface is a third optical degree of the optical node, and wherein the fourth optical interface is a first express interface.

11. The optical signal processor of claim 7, further comprising a fifth optical interface, wherein when the plurality of optical switches are programmed to perform the first function, the plurality of wavelength equalizers do not pass and block individual wavelengths from the fifth optical interface to the first optical interface and from the fifth optical interface to the second optical interface, and wherein when the plurality of optical switches are programmed to perform the second function, the plurality of wavelength equalizers pass and block individual wavelengths from the fifth optical interface to the first optical interface and from the fifth optical interface to the second optical interface.

12. The optical signal processor of claim 11, wherein the first optical interface is a first optical degree of an optical node, and wherein the second optical interface is a second optical degree of the optical node, and wherein the third optical interface is a third optical degree of the optical node, and wherein the fourth optical interface is a first express interface, and wherein the fifth optical interface is a second express interface.

13. The optical signal processor of claim 7, wherein when the plurality of optical switches are programmed to perform the first function, the plurality of wavelength equalizers pass and block individual wavelengths between the first optical interface and the second optical interface, and wherein when the plurality of optical switches are programmed to perform the second function, the plurality of wavelength equalizers pass and block individual wavelengths between the first optical interface and the second optical interface.

* * * * *